No. 634,062. Patented Oct. 3, 1899.
M. MATTHEWS.
CYCLE.
(Application filed Mar. 3, 1898.)
(No Model.) 3 Sheets—Sheet 1.

Witnesses
A. J. Colbourne.
G. M. Neff.

Inventor
Marmaduke Matthews
by
Ridout & Maybee
attys

No. 634,062. Patented Oct. 3, 1899.
M. MATTHEWS.
CYCLE.
(Application filed Mar. 3, 1898.)
(No Model.) 3 Sheets—Sheet 3.

Witnesses
a. J. Colbourne
a. M. Neff

Inventor
Marmaduke Matthews
by
Ridout & Maybee
att'ys

THE NORRIS PETERS CO., PHOTO-LITHO., WASHINGTON, D. C.

UNITED STATES PATENT OFFICE.

MARMADUKE MATTHEWS, OF BRACONDALE, CANADA, ASSIGNOR OF ONE-HALF TO ALEXANDER JARDINE AND AGNES JARDINE, OF SAME PLACE.

CYCLE.

SPECIFICATION forming part of Letters Patent No. 634,062, dated October 3, 1899.

Application filed March 3, 1898. Serial No. 672,444. (No model.)

*To all whom it may concern:*

Be it known that I, MARMADUKE MATTHEWS, of the village of Bracondale, in the county of York and Province of Ontario, Canada, have invented certain new and useful Improvements in Cycles, of which the following is a specification.

The object of my invention is to devise a cycle which will be much more comfortable to ride upon rough roads than the ordinary bicycle and which will also be both stronger and lighter; and it consists, essentially, of a main wheel, upon the axle of which is supported the seat-standard or main frame, of trailing and steering wheels carried by frames, one or both journaled at one point on the seat-standard at or near the axle of the main wheel and having spring connections between their outward parts and the upper portion of the seat-standard, and of driving mechanism located centrally, or nearly so, of the main wheel, the whole being constructed in detail substantially as hereinafter more specifically described.

Figure 1:
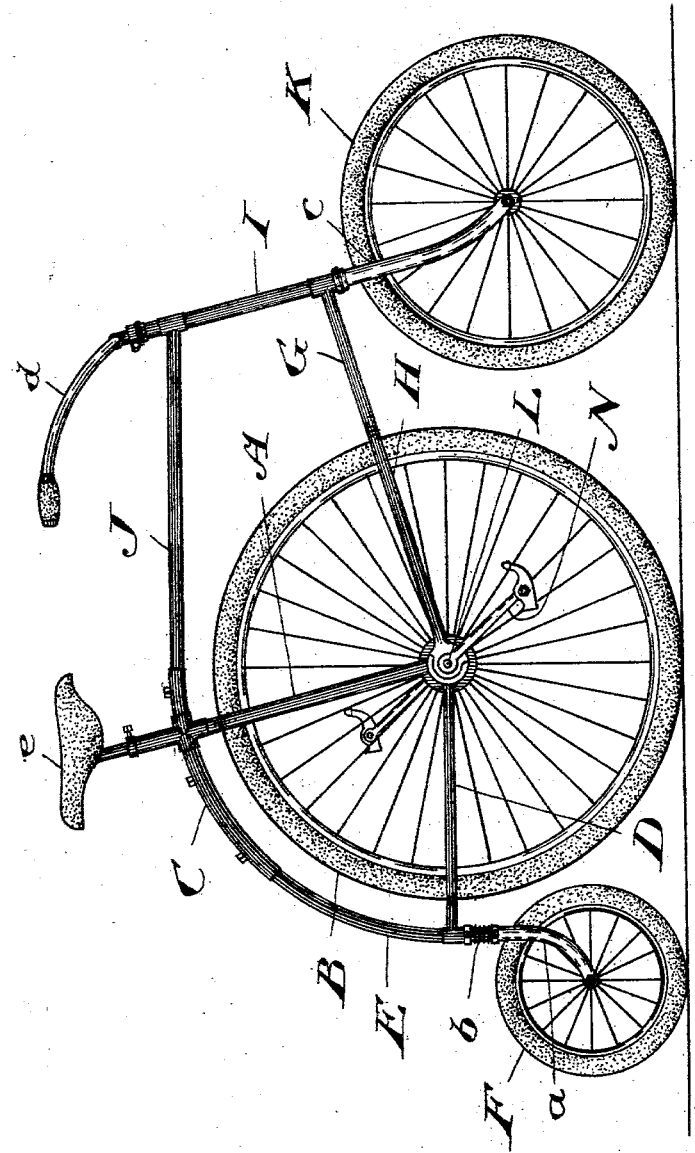
Figure 2:
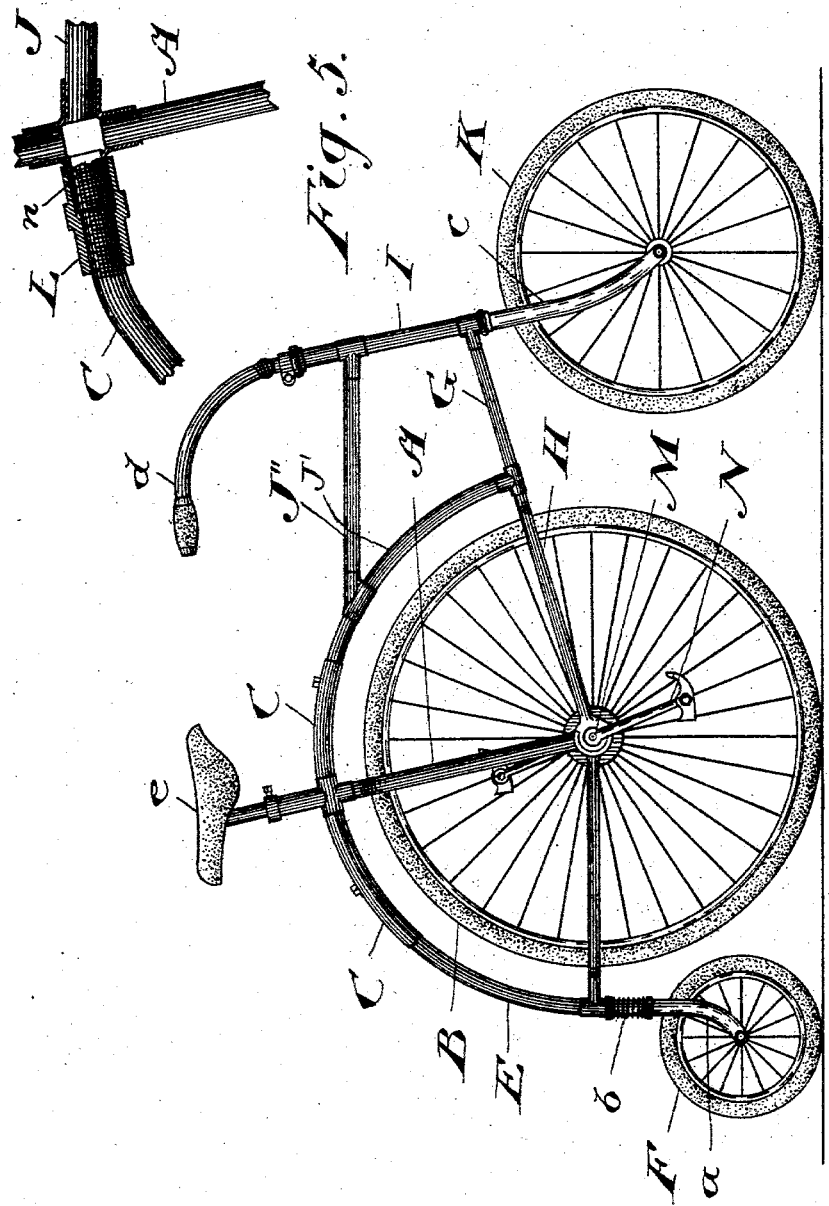
Figure 3:
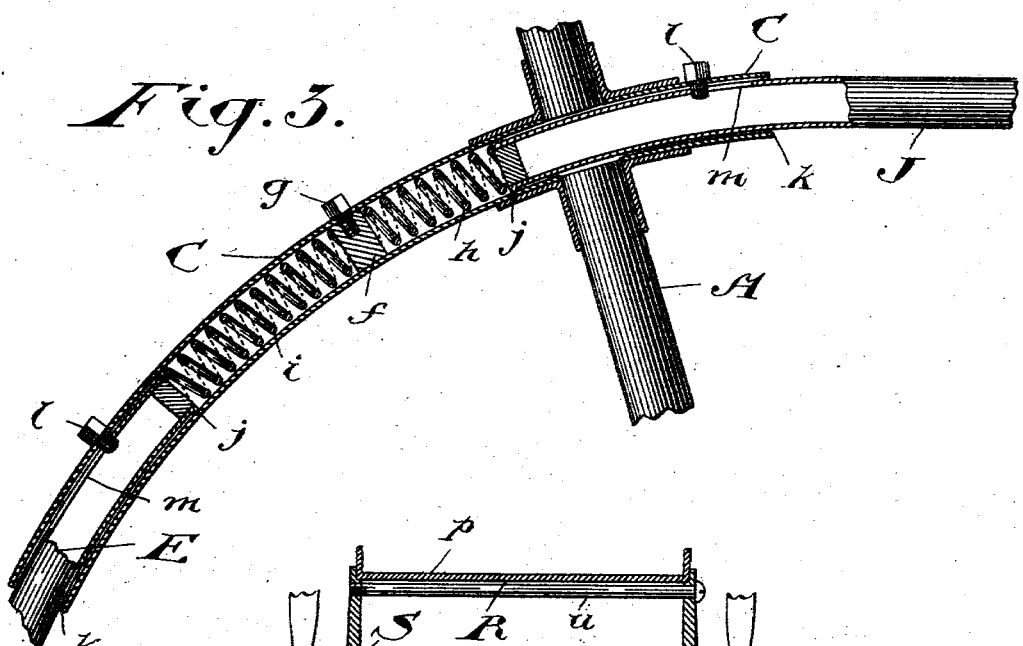
Figure 4:
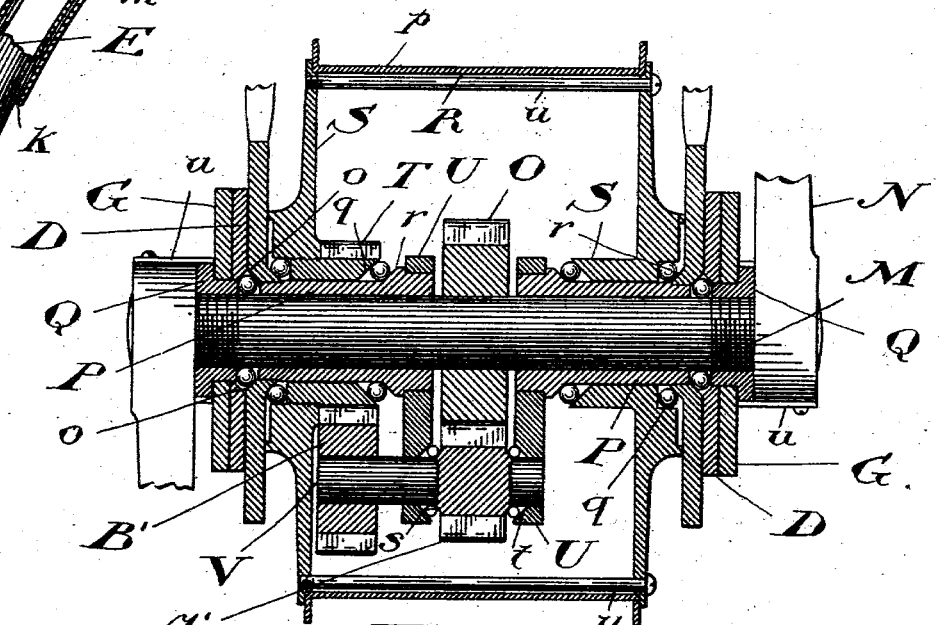

Figure 1 is a side elevation of a cycle constructed in accordance with my invention. Fig. 2 is a similar view showing a modification of the frame. Fig. 3 is a sectional elevation showing the spring connection between the parts of the frames. Fig. 4 is a longitudinal section of the driving mechanism of the wheel. Fig. 5 is a sectional elevation showing a detachable connection between the seat-standard of the main frame and the rear portion of the curved member connected thereto.

In the drawings like letters of reference indicate corresponding parts in the different figures.

In Fig. 1, A is the main frame or seat-standard of the cycle, which is suitably forked and arranged to carry the main wheel B, as hereinafter described. This main frame is provided with a hollow curved member C, which extends both before and behind the seat-standard and is formed on the arc of a circle struck from the center of the main axle.

D is the rear frame, suitably forked to embrace the main wheel and axle, as hereinafter described.

E is a member of the rear frame, suitably shaped and proportioned to slide freely within the hollow curved member C.

F is a trailing wheel, the fork $a$ of which is journaled in any suitable manner within the lower end of the member E. Round a portion of the fork is wound a coil-spring $b$, one end of which is secured to the fork, while the other is secured to the member E, so that the tension of the spring tends always to maintain the trailing wheel in line with the main wheel.

G is the front frame, comprising the fork H, embracing the main wheel and suitably journaled about its axle, of the head I, and the upper member J, which is suitably shaped and proportioned to slide freely within the hollow curved member C.

K is the steering-wheel, the fork $c$ of which is suitably journaled within the head I and provided with the handle-bar $d$.

To the upper end of the seat-standard A is suitably connected the saddle $e$.

Within the hollow member C, I secure a block $f$, of wood, leather, or other suitable substance, preferably by means of a screw $g$. (See Fig. 3.)

The ends of the members J and E of the front of the rear frames are preferably closed and coil-springs $h$ and $i$ located between them and the block $f$. It will be noted that the ends of the members E and J are slightly enlarged at $j$, while the member C is slightly contracted in diameter at $k\ k$, so that but small portions of the members are in running contact with one another, reducing the liability of jamming to a minimum. In order to limit the motion of the members within one another, I thread set-screws $l\ l$ through the member C into slots $m\ m$ in the members E and J, so that the length of the slots limits the amount of play allowed these members within the member C.

In Fig. 2 a slight modification of the frame is shown. The curved portion of the upper member J', which is much longer than in Fig. 1, is continued down to meet the fork H and has an extension J'' connecting with the head. This will permit of a much greater amount of play being allowed between the members J and C; but in other respects it is not so good as the form shown in Fig. 1.

In Fig. 5 the rear portion of the member C is shown detachably connected to the seat-standard.

L is a coupling internally right and left hand threaded.

The rear part of the member C and the connection n are similarly threaded, so that by engaging them with the coupling L and screwing up the latter they will be drawn tightly together, as indicated. By loosening this coupling and by disconnecting the rear frame from about the main axle the rear wheel may be entirely removed and a two-wheeled vehicle left, which will commend the device to racing men.

On reference to Fig. 4 the construction of the driving-gear will be readily understood.

M is the main axle, to the ends of which are rigidly connected the cranks N. To the center of this axle is rigidly connected the gear-pinion O.

P P are sleeves embracing the axle on each side of the pinion O and rigidly secured to the main frame A. Upon the ends of the axle are screwed the nuts Q, which form, with the axle and with the cups o upon the main frame, races for two sets of balls, so that the axle will revolve freely within the main frame and the sleeves P.

R is a hollow hub formed by the casing p and the end disks S, held together by the bolts u. Formed on or connected to one of the end disks S is the gear-pinion T. Formed on the end disks S are the cups q, which form, with the cones r on the main frame A and sleeves P P, races for four sets of balls. Connected to the inner ends of the sleeves P P are the arms U, in which is journaled the shaft V, carrying the pinion A', meshing with the pinion O, and the pinion B', meshing with the pinion T.

On the shaft V are formed cones s, which form, with the cups t on the arms U, bearings for two sets of balls.

It will be seen from the construction set out that a rotary motion of the main axle M will be conveyed, by means of the gear-pinions O, A', B', and T, to the hub R, and the gearing may be so proportioned that the main wheel will thus be driven at any desired proportionate speed to that of the axle. It also follows from the construction set out that the tightening of the nuts Q upon the axle will simultaneously adjust all the bearings. These nuts may be held as adjusted by means of the spring-fingers u, fast on the cranks N, which engage with notches formed in the peripheries of the nuts. These nuts are also preferably shaped to receive the portions of the front and rear frames G and D, which are journaled thereon, as shown.

It will be noticed that one great advantage of the gearing just described is that it is contained entirely within the hub R and is thus kept entirely out of the way of dust and dirt.

In constructing my device it is evident that various changes might be made without departing from the spirit of my invention. One change in the form of frame is indicated in Fig. 2.

Instead of making both front and rear frames to slide within the member C one of them may be rigidly connected to the main frame. The member J is so shown connected by brazing in Fig. 5.

The advantages derived from the construction described are many and obvious. As the weight of the rider is supported almost directly over the main axle, it is evident that a stronger frame can be obtained with a less weight than when the rider is supported midway between two wheels. By removing the driving mechanism to the center of the main wheel I place it entirely out of the reach of the flying mud, which constitutes a very weak point of the present location of the cranks midway between the two wheels. In addition to the advantages derived from the method of supporting the rider's weight and the location of the driving-gear the use of the three wheels with the divided spring-connected frames makes the cycle very easy-running over rough roads, as under almost any condition at least two of the wheels will be upon the ground to support the rider's weight while the third is lifting over a lump or dropping into a depression. When the steering-wheel strikes an obstruction, it lifts and pushes the upper member of its frame within the hollow member of the main frame, thus collapsing the spring therein without tending to lift the main wheel and the rider with it. When the main wheel lifts over an obstruction, the springs within the hollow member of the main frame force outwardly the front and rear frame members telescoped therein, and thus maintains the trailing and steering wheels in contact with the ground to partially support the rider's weight, and thus ease the shock of the rise and fall of the main wheel. When the trailing wheel lifts over an obstacle, the member of its frame within the hollow member of the main frame collapses the spring therein and allows the trailing wheel to rise without imparting any undue shock to the rider.

In an ordinary bicycle the use of a small steering-wheel will be inadmissable, as it does not roll so readily over obstacles as a larger wheel, and thus will impart greater shocks to the rider when his weight is partly carried by the steering-wheel; but in my cycle the spring connection in the frame obviates any such trouble.

Another advantage of my cycle is the shortened wheel-base which it gives and the ease with which it can be manipulated. It will be possible to steer it about among obstructions which would entirely prevent the use of an ordinary bicycle.

Although I show and prefer to use the central drive, as indicated, yet it will be apparent that the construction of the frame is applicable to any form of drive in which the crankaxle is located in front of the axle of the driven wheel.

By using a small steering-wheel I secure a very short and therefore very strong front fork, thus overcoming a great weakness of an ordinary bicycle.

It will be observed that one shaft V, with gear-wheels A' B', is shown in the drawings, but more than one might be used, if desired, so as to distribute the strain of driving.

What I claim as my invention is—

1. In a cycle, a main wheel and a seat-standard or main frame journaled on the axle thereof, in combination with a frame having a trailing wheel pivoted therein, said frame being journaled at or near the axle independently of the aforesaid seat-standard or main frame, a spring connection between said frames, and a frame carrying a steering-wheel and connected to the front of the main frame, substantially as described.

2. In a cycle, a main wheel and a seat-standard or main frame supported on the axle thereof, in combination with a frame carrying a trailing wheel and having a journaled connection to the main frame; means for holding said frames in their proper relative positions; and a frame carrying a steering-wheel and having a journaled connection to the main frame at or near the axle and a spring connection with the upper part thereof, substantially as and for the purpose specified.

3. A cycle-frame formed in three parts pivotally connected at their lower parts and provided with spring connections at their upper parts, the central part being adapted to carry the main wheel, the forward part the steering-wheel and the rearward part a trailing wheel, substantially as and for the purpose specified.

4. In a cycle, a frame adapted to carry main and steering wheels, in combination with a frame adapted to carry a trailing wheel and having a journaled connection to the main frame at or near the axle of the main wheel, the two parts of the frame being provided with members telescoped together and forming arcs of a circle struck from the center of the said journaled connection; and a compression-spring connected with the said telescoped members so as to tend to keep them extended, substantially as and for the purpose specified.

5. In a cycle, a main frame adapted to carry a main wheel, in combination with frames adapted to carry steering and trailing wheels and having journaled connections to the main frame at or near the axle of the main wheel, each frame having a member telescoped with a corresponding member of the main frame, which members form arcs of a circle struck from the center of the journaled connection of the frames; and compression-springs connected with each pair of telescoped members so as to tend to keep them extended.

6. In a cycle, a main frame adapted to carry a main wheel, and provided with a hollow member formed on an arc of a circle struck from the center of the main axle, in combination with frames adapted to carry steering and trailing wheels and journaled about the axle of the main wheel, each frame having a member telescoped within the hollow member of the main frame and having a slot therein; a block secured within the hollow main frame member; a compression-spring located between the end of each of the inner members and the said block, and set-screws threaded through the main frame member into slots formed in the inner members, coacting with the springs, slots and blocks, substantially as and for the purpose specified.

7. In a cycle, the main frame A; two sleeves P, P, rigidly connected to the said frame; the hollow hub R; the end disks S, of which embrace the said sleeves; the gear-pinion T, fast on said hub; the arms U, fast on the inner ends of the sleeves P; the shaft V, journaled in the said arms; the pinion A' on the said shaft; the pinion B' on the shaft meshing with the pinion T, in combination with the axle M; the pinion O, thereon meshing with the pinion A'; the cups and cones o, q, r, s, t, and balls therefor; the adjusting-nuts Q; and the frames D and G, journaled on the said nuts, substantially as and for the purpose specified.

8. In a cycle, a main frame carrying a main wheel and a steering-wheel, in combination with a hollow curved member detachably connected to the main frame, and formed on the arc of a circle struck from the center of the axle of the main wheel; and a supplementary frame journaled on the axle of the main wheel, and having a curved member adapted to enter the aforesaid hollow curved member; a coil-spring arranged between the said members, and a trailing wheel suitably journaled on the supplemental frame, substantially as and for the purpose specified.

Toronto, Canada, February 28, 1898.

MARMADUKE MATTHEWS.

In presence of—
  JOHN G. RIDOUT,
  J. EDW. MAYBEE.